United States Patent
Zaffetti et al.

(10) Patent No.: US 11,633,799 B2
(45) Date of Patent: Apr. 25, 2023

(54) CONTROL ASSEMBLY FABRICATION VIA BRAZING

(71) Applicant: Hamilton Sundstrand Corporation, Charlotte, NC (US)

(72) Inventors: Mark A. Zaffetti, Suffield, CT (US); Benjamin Abraham, Marlborough, CT (US); Timothy Sauerhoefer, Broad Brook, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/060,359

(22) Filed: Oct. 1, 2020

(65) Prior Publication Data

US 2022/0105582 A1    Apr. 7, 2022

(51) Int. Cl.
  *B23K 1/00* (2006.01)
  *B23K 1/018* (2006.01)
  *B23K 101/14* (2006.01)

(52) U.S. Cl.
  CPC ............ *B23K 1/018* (2013.01); *B23K 1/0012* (2013.01); *B23K 2101/14* (2018.08)

(58) Field of Classification Search
  CPC .............. B23K 1/0012; B23K 35/0233; B23K 35/0244; B23K 35/025; B23K 35/302; B23K 35/3053
  See application file for complete search history.

(56) References Cited

U.S. PATENT DOCUMENTS

| | | | |
|---|---|---|---|
| 3,375,570 A | | 4/1968 | Dubusker et al. |
| 5,931,224 A | * | 8/1999 | Chevallier ............ F28D 1/0341 165/DIG. 466 |
| 6,216,775 B1 | * | 4/2001 | Hedman ................. F28F 9/026 165/96 |
| 6,408,940 B1 | * | 6/2002 | Naji ...................... F28F 9/0214 165/906 |
| 9,163,882 B2 | | 10/2015 | Crawford |
| 9,614,206 B2 | * | 4/2017 | Choi .................... H01M 50/581 |
| 9,638,471 B2 | * | 5/2017 | Neumann ............... F28D 15/00 |
| 10,006,722 B2 | * | 6/2018 | Kenney ...................... F28F 3/10 |
| 10,801,789 B2 | * | 10/2020 | Subramanyam .... H01M 10/625 |
| 10,935,330 B2 | * | 3/2021 | Subramanyam ......... F24F 11/30 |

(Continued)

OTHER PUBLICATIONS

Extended European Search Report for EP Application No. 21186462.4, dated Jan. 19, 2022, pp. 1-7.

*Primary Examiner* — Erin B Saad
(74) *Attorney, Agent, or Firm* — Cantor Colburn LLP (57) ABSTRACT

Systems and methods to control fabrication of an assembly involve a first end sheet having an interior surface and an exterior surface, opposite the interior surface. A system includes interior sheets, the interior sheets including a first interior sheet at one end of a stack of the interior sheets and including a last interior sheet at an opposite end of the stack of the two or more interior sheets, the first interior sheet being adjacent to the interior surface of the first end sheet, and a second end sheet having an interior surface and an exterior surface, opposite the interior surface. The last interior sheet is adjacent to the interior surface of the last end sheet, and the interior surface of the first end sheet or the second end sheet includes venting features, the venting features including holes or slots to channel heat, gas, or vapor during a brazing process.

3 Claims, 6 Drawing Sheets (56) References Cited

U.S. PATENT DOCUMENTS

| | | | | |
|---|---|---|---|---|
| 2002/0066552 A1* | 6/2002 | Komoda | ............... | F28F 19/004 |
| | | | | 165/134.1 |
| 2005/0155749 A1* | 7/2005 | Memory | ............... | F28D 9/0075 |
| | | | | 165/167 |
| 2005/0194123 A1* | 9/2005 | Strahle | .................... | F28F 3/048 |
| | | | | 165/167 |
| 2012/0170222 A1* | 7/2012 | Dede | ....................... | F28F 3/083 |
| | | | | 165/173 |
| 2016/0204486 A1* | 7/2016 | Kenney | ............... | H01M 10/613 |
| | | | | 29/890.03 |
| 2016/0315365 A1* | 10/2016 | Vanderwees | ...... | H01M 10/6557 |
| 2017/0038150 A1 | 2/2017 | Kalbacher et al. | | |
| 2017/0241716 A1* | 8/2017 | Schatz-Knecht | ..... | F28F 21/084 |
| 2019/0017748 A1* | 1/2019 | Sun | ........................ | F28F 3/048 |
| 2019/0257595 A1 | 8/2019 | Barriga et al. | | |

\* cited by examiner

CONTROL ASSEMBLY FABRICATION VIA BRAZING

STATEMENT OF FEDERAL SUPPORT

This invention was made with Government support under Contract No. NNJ06TA25C; Sub-Contract No. RH6-118203 awarded by NASA. The Government has certain rights in the invention.

BACKGROUND

Exemplary embodiments pertain to the art of assembly fabrication and, in particular, to control of assembly fabrication via brazing.

Brazing is a process by which two or more metal components are joined together by melting and flowing a filler metal into the interface. The filler metal has a lower melting point than the metal components being joined. Exemplary filler materials include aluminum-silicon, copper, copper-silver, copper-zinc (i.e., brass), copper-tin (i.e., bronze), and nickel alloy.

BRIEF DESCRIPTION

In one embodiment, a system to control fabrication of an assembly includes a first end sheet having an interior surface and an exterior surface, opposite the interior surface. The system also includes two or more interior sheets, the two or more interior sheets including a first interior sheet at one end of a stack of the two or more interior sheets and including a last interior sheet at an opposite end of the stack of the two or more interior sheets, the first interior sheet being adjacent to the interior surface of the first end sheet. A second end sheet has an interior surface and an exterior surface, opposite the interior surface. The last interior sheet of the two or more interior sheets is adjacent to the interior surface of the last end sheet. The interior surface of the first end sheet or the interior surface of the second end sheet includes one or more venting features, the one or more venting features including holes or slots to channel heat, gas, or vapor during a brazing process to braze the first end sheet, the two or more interior sheets, and the second end sheet into the assembly.

Additionally or alternatively, in this or other embodiments, the one or more venting features include a series of holes that channel the heat, the gas, or the vapor from the interior surface through to the exterior surface of the first end sheet or the second end sheet.

Additionally or alternatively, in this or other embodiments, the series of holes have a geometric shape.

Additionally or alternatively, in this or other embodiments, different holes in the series of holes have different shapes.

Additionally or alternatively, in this or other embodiments, the one or more venting features include slots that channel the heat, the gas, or the vapor from a central portion of the interior surface to edges of the interior surface of the first end sheet or the second end sheet.

Additionally or alternatively, in this or other embodiments, the slots are formed in a pattern.

Additionally or alternatively, in this or other embodiments, the pattern is a checkerboard or the pattern includes concentric circles with diagonal slots that cross at a center of the concentric circles and extend to the edges of the interior surface of the first end sheet or the second end sheet.

Additionally or alternatively, in this or other embodiments, the one or more venting features include slots that channel the heat, the gas, or the vapor to a particular area of the interior surface to cause incomplete brazing at the particular area between the interior surface of the first end sheet and the first interior sheet or between the interior surface of the second end sheet and the last interior sheet.

Additionally or alternatively, in this or other embodiments, the venting features include both holes and slots.

Additionally or alternatively, in this or other embodiments, both the interior surface of the first end sheet and the interior surface of the second end sheet include venting features.

In another embodiment, a method of controlling a brazing process to fabricate an assembly includes configuring a stack of layers. The stack includes a first end sheet having an interior surface and an exterior surface, opposite the interior surface. The stack also includes two or more interior sheets, the two or more interior sheets including a first interior sheet at one end of a stack of the two or more interior sheets and including a last interior sheet at an opposite end of the stack of the two or more interior sheets, the first interior sheet being adjacent to the interior surface of the first end sheet. A second end sheet of the two or more interior sheets has an interior surface and an exterior surface, opposite the interior surface, wherein the last interior sheet of the two or more interior sheets is adjacent to the interior surface of the last end sheet. The method includes including one or more vent features in the interior surface of the first end sheet or the interior surface of the second end sheet, the one or more venting features including holes or slots to channel heat, gas, or vapor during the brazing process used to braze the first end sheet, the two or more interior sheets, and the second end sheet to fabricate the assembly.

Additionally or alternatively, in this or other embodiments, the one or more venting features include a series of holes that channel the heat, the gas, or the vapor from the interior surface through to the exterior surface of the first end sheet or the second end sheet.

Additionally or alternatively, in this or other embodiments, the series of holes have a geometric shape.

Additionally or alternatively, in this or other embodiments, different holes in the series of holes have different shapes.

Additionally or alternatively, in this or other embodiments, the one or more venting features include slots that channel the heat, the gas, or the vapor from a central portion of the interior surface to edges of the interior surface of the first end sheet or the second end sheet.

Additionally or alternatively, in this or other embodiments, the slots are formed in a pattern.

Additionally or alternatively, in this or other embodiments, the pattern is a checkerboard or the pattern includes concentric circles with diagonal slots that cross at a center of the concentric circles and extend to the edges of the interior surface of the first end sheet or the second end sheet.

Additionally or alternatively, in this or other embodiments, the one or more venting features include slots that channel the heat, the gas, or the vapor to a particular area of the interior surface to cause incomplete brazing at the particular area between the interior surface of the first end sheet and the first interior sheet or between the interior surface of the second end sheet and the last interior sheet.

Additionally or alternatively, in this or other embodiments, the venting features include both holes and slots.

Additionally or alternatively, in this or other embodiments, the including the venting features includes including the venting features on both the interior surface of the first end sheet and the interior surface of the second end sheet.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, brazing is a process by which metal components are joined. The filler material used in brazing generally has a higher melting point than the filler used in soldering and, thus, produces a stronger joint. Brazing is widely used in various applications. For example, brazing preforms may be used to attach electronic components with silicon dies to a substrate (e.g., printed circuit board). As another example, brazed plate heat exchangers include plates (e.g., copper, stainless steel) that are stacked and brazed together to aggregate the heat transfer area over multiple layers of the stack in a compact assembly. The brazing rather than bolting, for example, means that rubber gaskets are not needed between adjacent plates. Yet another example, used herein for explanatory purposes is a brazed plate and fin heat exchanger that includes plates and fins stacked as interior components between end sheets and brazed together.

Embodiments of the systems and methods detailed herein relate to control of assembly fabrication via brazing. An assembly (e.g., plate and fin heat exchanger) includes two end sheets or outer sheets on each end of the assembly. The outer sheets sandwich the other components that make up the assembly. In prior assemblies formed via brazing (i.e., brazed assemblies) with solid end sheets, heat, gas, and vapor trapped between an outer sheet and the next sheet of the assembly during brazing may result in incomplete brazing. The heat, gas, and vapor that prevent complete brazing in some areas result in a weaker bond in those areas. When the brazing process requires a fast cooling rate from the brazing temperature in order to achieve specific material properties, partially brazed areas can also result. As the footprint of the assembly grows, the distance that heat, gas, and vapor must travel to vent out of the assembly also necessarily grows. Thus, issues with the prior brazing process may be exacerbated.

According to one or more embodiments, control of assembly fabrication via brazing is achieved by incorporating venting features into the outer sheets of the assembly, as detailed. Exemplary venting features include holes, slots, or a combination of the two. One exemplary form of control involves venting heat, gas, and vapor out of the assembly via the venting features to achieve complete and uniform brazing. Another exemplary form of control involves directing heat, gas, and vapor to specific areas to achieve an incomplete brazing only where desired.

Figure 1:
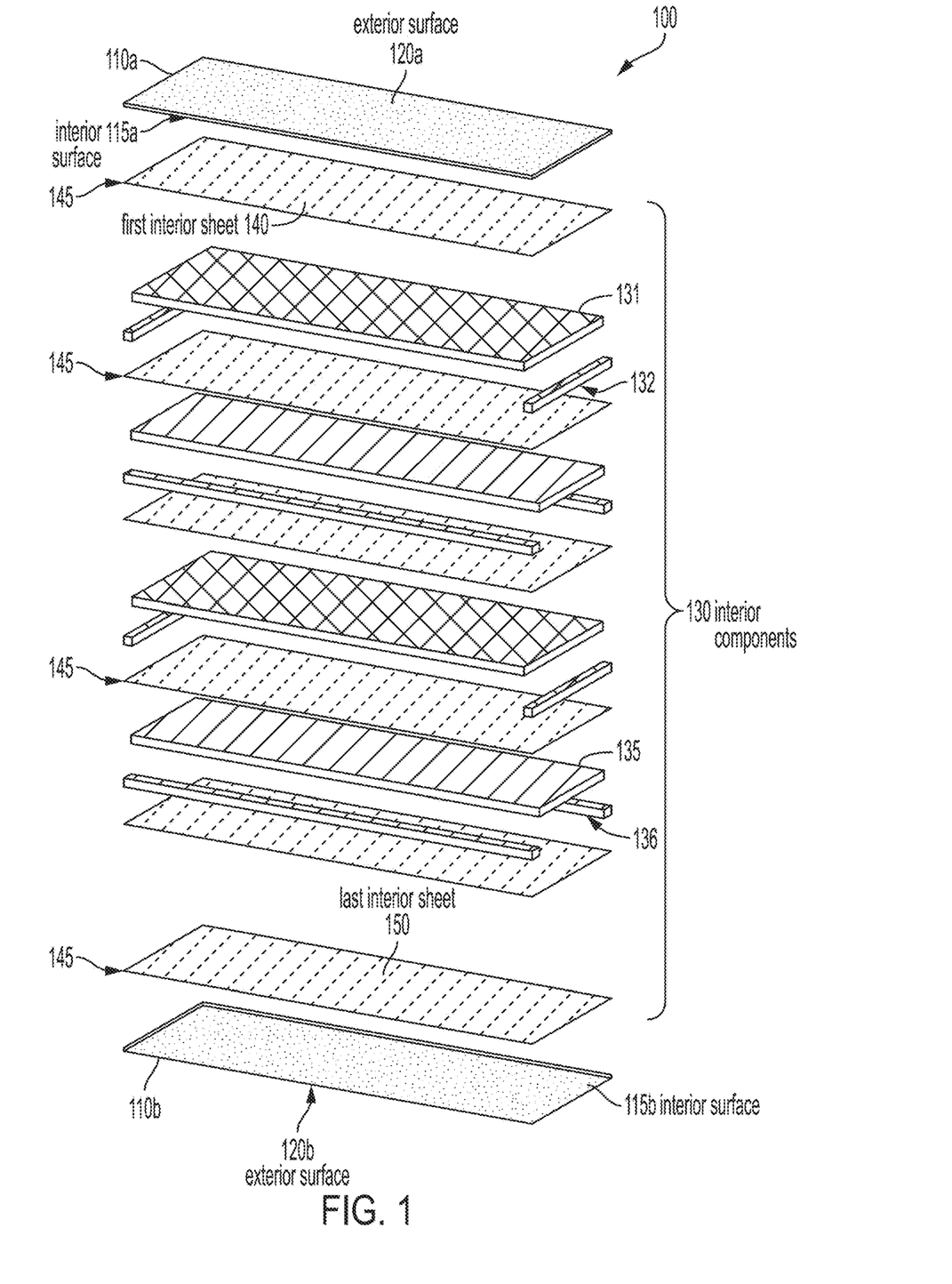
FIG. 1 is an exploded view of aspects of an exemplary assembly that may be fabricated according to one or more embodiments.

FIG. 1 is an exploded view of aspects of an exemplary assembly 100 that may be fabricated via brazing according to one or more embodiments. The exemplary assembly 100 is a plate and fin heat exchanger. The exploded view in FIG. 1 shows the layers that are brazed to form the assembly 100 shown in FIG. 2. Two end sheets 110a, 110b (generally referred to as 110) sandwich the interior components 130. Each of the end sheets 110 has an interior surface 115a, 115b (generally referred to as 115) that is adjacent to the interior components 130. In the view shown in FIG. 1, the interior sheet 115a of the end sheet 110a is not visible but the interior surface 115b of the end sheet 110b is visible. Each of the end sheets 110 also has an exterior surface 120a, 120b (generally referred to as 120) that is opposite the corresponding interior surface 115a, 115b. In the view shown in FIG. 1, the exterior surface 120a of the end sheet 110a is visible but the exterior surface 120b of the end sheet 110b is not visible.

The interior components 130 that are arranged in a stack, as shown, include a first interior sheet 140 that is adjacent to the end sheet 110a and, specifically, to the interior surface 115a of the end sheet 110a. The interior components 130 also include a last interior sheet 150 that is adjacent to the end sheet 110b and, specifically, to the interior surface 115b of the end sheet 110b. More particularly, a side of the first interior sheet 140 that is opposite the side that is adjacent to the other interior components 130 is adjacent to the interior surface 115a of the end sheet 110a and is brazed to the interior surface 115a of the end sheet 110a. And, a side of the last interior sheet 150 that is opposite the side that is adjacent to the other interior components 130 is adjacent to the interior surface 115b of the end sheet 110b and is brazed to the interior surface 115b of the end sheet 110b.

The exemplary end sheets 110 and interior components 130 of the exemplary assembly 100 pertain to a heat exchanger. For example, the interior components 130 include interleaved sets of a hot fin 131 and hot closure bars 132 and a cold fin 135 and cold closure bars 136 with parting sheets 145 that separate the interleaved sets. The first interior sheet 140 and the last interior sheet 150 in the exemplary assembly 100 are parting sheets 145, as shown. The dimensions (i.e., length, width, thickness) of the components (end sheets 110, interior components 130) are not intended to be limited by the example shown in FIG. 1. The material of the end sheets 110 and interior components 130 is based on the type of assembly 100. For example, an aluminum heat exchanger may include end sheets 110 of 3003 aluminum or 3004 aluminum, fins of 6951 aluminum, and parting sheets of a 6000 series aluminum core that is clad on both sides with braze alloy. As another example, a steel heat exchanger may include components that are mostly 347 stainless steel with some fins of nickel 201 and others of 347 stainless steel.

As discussed with reference to FIG. 3, the end sheets 110 include venting features 300 to facilitate control during the brazing process to fabricate the assembly 100 according to one or more embodiments. According to an exemplary embodiment, the venting features 300 may ensure that heat, gas, and vapor produced during the brazing process to fabricate the assembly 100 from the end sheets 110 and the interior components 130 are vented out. This ensures uniform and complete brazing between the interior surface 115a of the end sheet 110a and the first interior sheet 140 or between the interior surface 115b of the end sheet 110b and the last interior sheet 150. According to other exemplary embodiments, the venting features 300 may channel heat, gas, and vapor produced during the brazing process to particular areas 710 (FIG. 7) of the interface between the interior surface 115a of the end sheet 110a and the first interior sheet 140 or of the interface between the interior surface 115b of the end sheet 110b and the last interior sheet 150 in order to control incomplete brazing in those particular areas 710.

Figure 2:
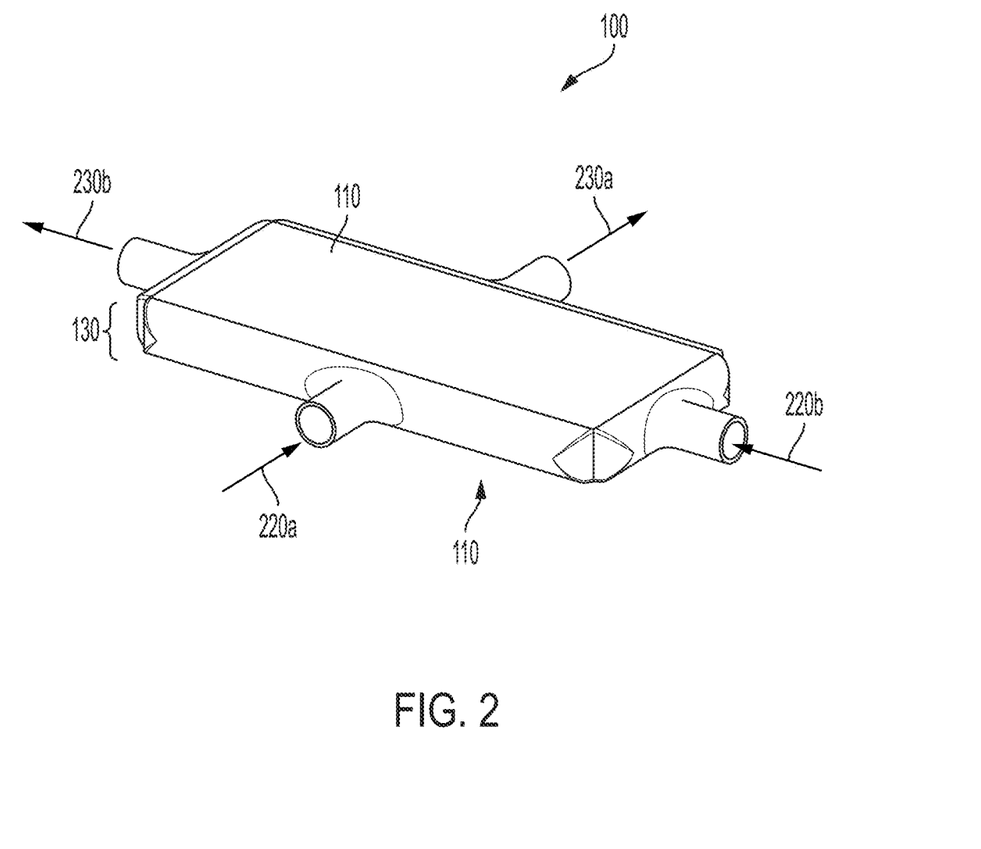
FIG. 2 shows a fabricated exemplary assembly according to one or more embodiments.

FIG. 2 shows a fabricated exemplary assembly 100 according to one or more embodiments. The end sheets 110 and the interior components 130 are brazed together, as indicated. The interior sheets 130 that are sandwiched between the two end sheets 110 and one of the end sheets 110 are not visible in the view shown in FIG. 2. The exemplary assembly 100 is a plate and fin heat exchanger. As such, an inlet 220a and outlet 230a for a first medium and an inlet 220b and outlet 230b for a second medium are shown. One of the media (i.e., the first medium or the second medium) transfers heat to the other while traversing separate paths through the assembly 100.

Figure 3:
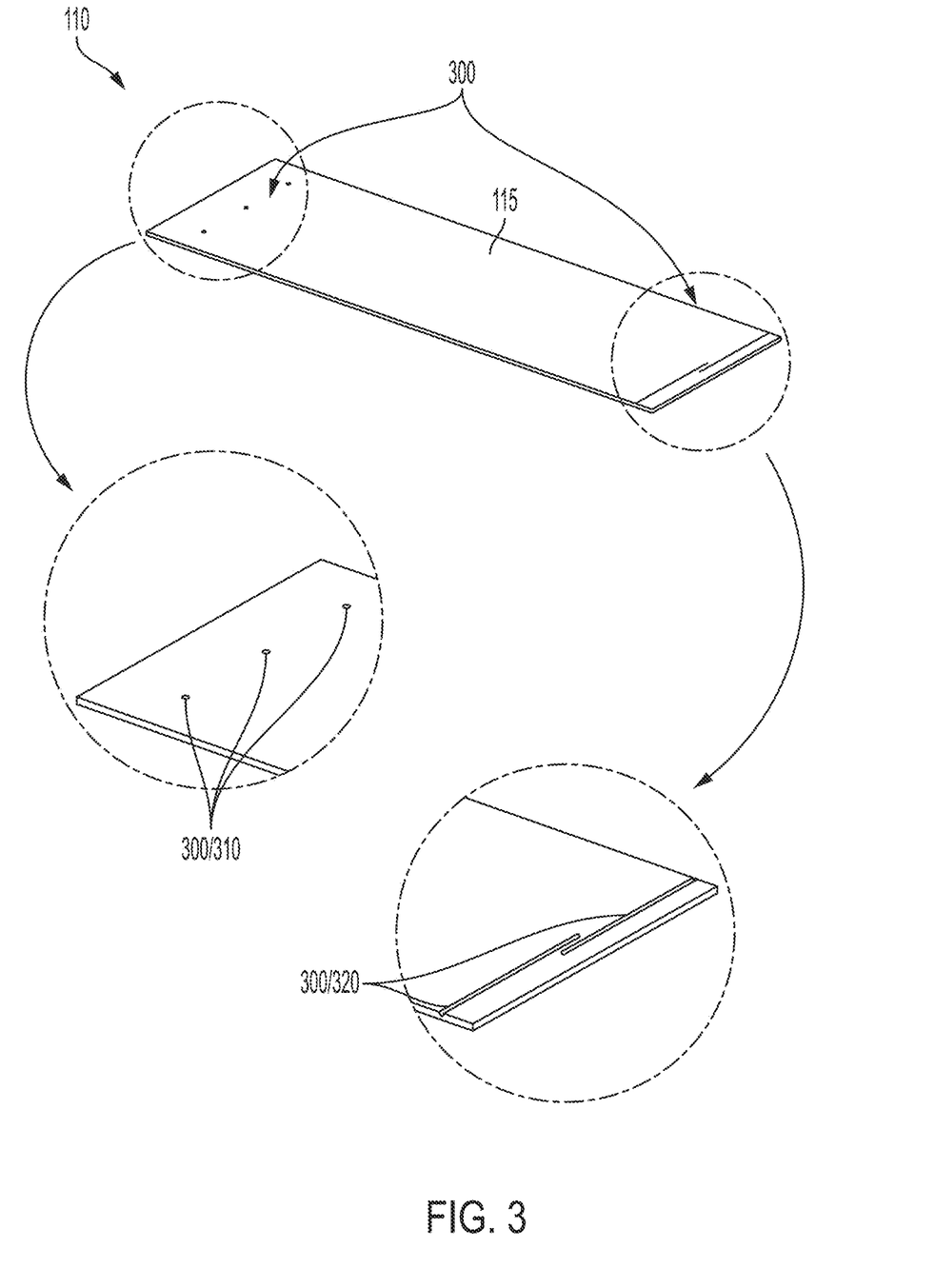
FIG. 3 shows exemplary venting features that facilitate control of assembly fabrication via brazing according to one or more embodiments.

FIG. 3 shows exemplary venting features 300 that facilitate control of assembly fabrication via brazing according to one or more embodiments. A different type of venting feature 300 is shown on each end of the end sheet 110 in FIG. 3. As one of the magnified views indicates, the type of venting feature 300 shown on one end of the end sheet 110 is holes 310. These holes 310 go through the end sheet 110 and channel heat, gas, and vapor out of the assembly 100 during the brazing process. The exemplary holes 310 shown in FIG. 3 are not intended to limit the numbers and positions of the holes 310 that may be incorporated in one or more end sheets 110 in order to vent heat, gas, and vapor out of the assembly 100 during brazing of the end sheet 100 to either the first interior sheet 140 or the last interior sheet 150. Additional examples are discussed with reference to FIGS. 8 and 9.

As the other magnified view indicates, the type of venting feature 300 shown on another end of the end sheet 110 is slots 320. Unlike the holes 310, the slots 320 are formed as a trench in the interior surface 115. As shown, these slots 320 channel heat, gas, and vapor to the edges of the end sheet 110 and out of the assembly 100. However, as discussed with reference to FIG. 7, one or more slots 320 may be used to channel heat, gas, and/or vapor to a particular area 710 of the interface between the end sheet 110 and the first interior sheet 140 or the last interior sheet 150 during brazing to controllably create an area 710 of incomplete brazing. While holes 310 and slots 320 may both be formed on a given end sheet 110, as shown in FIG. 3, only one type of venting feature 300 may be included, as well, as shown in FIGS. 4-9.

Figure 4:
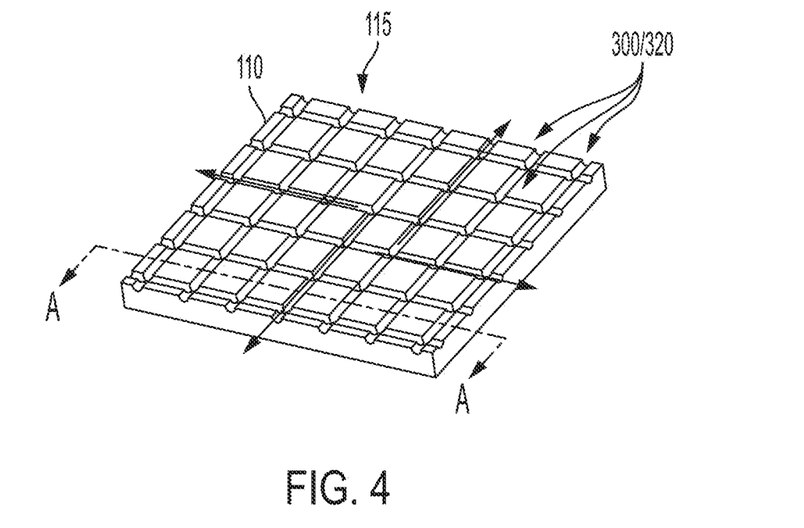
FIG. 4 shows an exemplary end sheet of an assembly that facilitates control of assembly fabrication via brazing based on slots according to one or more embodiments.

FIG. 4 shows an exemplary end sheet 110 used to control assembly fabrication via brazing according to one or more embodiments. The interior surface 115 of the end sheet 110 is visible in the view of FIG. 4. The venting features 300 included on the interior surface 115 are slots 320 formed in a checker pattern. Each of the slots 320 extends from one edge to an opposite edge. As such, heat, gas, and vapor generated during brazing of the end sheet 110 to a first interior sheet 140 or a last interior sheet 150 may be channeled out at the edges via the slots 320, as indicated by the arrows. The cross-section A-A indicated in FIG. 4 is shown in FIG. 5.

Figure 5:
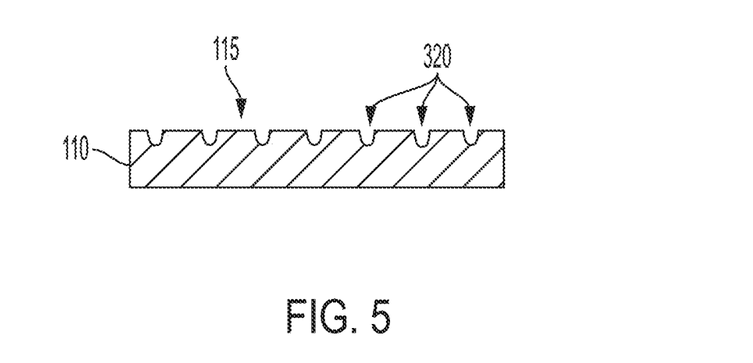
FIG. 5 is a cross-sectional view through A-A indicated in FIG. 4.

FIG. 5 is a cross-sectional view A-A indicated in FIG. 4. The slots 320 extending in one direction are shown by the cross-sectional view. As previously noted, the slots 320 are formed as trenches in the interior surface 115 of the end sheet 110. The shape and depth of the slots 320 is not intended to be limited by the example shown. The shape and depth of the slots 320 may be based on the overall dimensions of the end sheet 110. Further, different slots 320 on the same interior surface 115 may have different shapes and depths. The selection of the location and characteristics of the slots 320 may be based on thermal analysis and other studies regarding the brazing process. These studies may be particular to the materials of the end sheet 110 and the first interior sheet 140 or last interior sheet 150, as well as to their dimensions.

Figure 6:
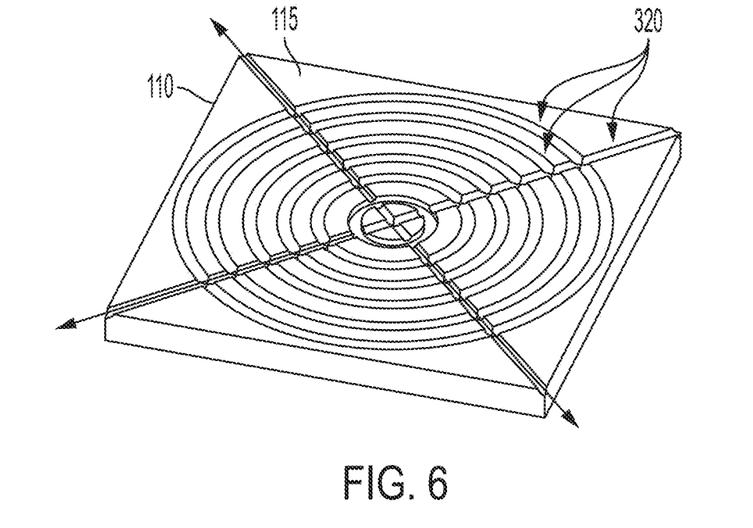
FIG. 6 shows an exemplary end sheet of an assembly that facilitates control of assembly fabrication via brazing based on an exemplary pattern of slots according to one or more embodiments.

FIG. 6 shows an exemplary end sheet 110 that facilitates control of assembly fabrication via brazing according to one or more embodiments. The interior surface 115 of the end sheet 110 is visible in the view of FIG. 6. The venting features 300 included on the interior surface 115 are slots 320 formed in concentric circles and diagonal lines. As shown, the slots 320 formed as concentric circles channel heat, gas, and vapor to the diagonal lines, which vent the heat, gas, and vapor toward the edges and out at the corners of the end sheet 110 in the exemplary case.

Figure 7:
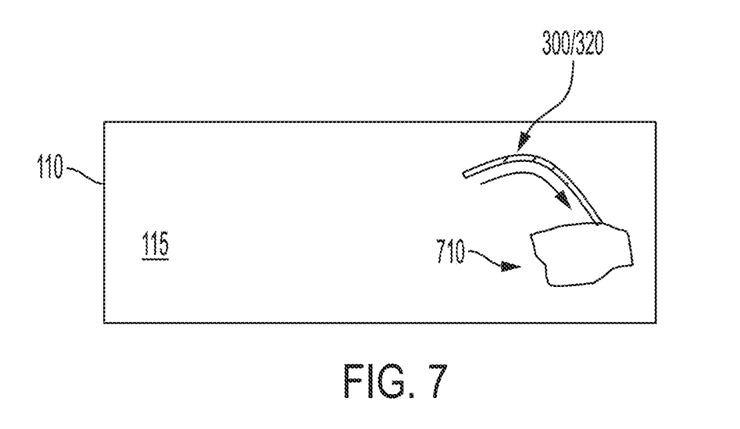
FIG. 7 shows an interior surface of an exemplary end sheet that facilitates control of assembly fabrication via brazing according to one or more embodiments.

FIG. 7 shows an interior surface 115 of an exemplary end sheet 110 that facilitates control of assembly fabrication via brazing according to one or more embodiments. As previously noted, control during brazing is not limited to venting out heat, gas, and vapor to facilitate uniform and complete brazing between the end sheet 110 and either the first interior sheet 140 or the last interior sheet 150. The exemplary slot 320 shown in FIG. 7 is a venting feature 300 that controllably creates an area 710 of incomplete brazing.

That is, when the first interior sheet 140 or the last interior sheet 150 is brazed to the interior surface 115 shown in FIG. 7, some of the heat, gas, and vapor generated during the brazing process will be channeled to the area 710. This channeling path is indicated by the arrow along the slot 320. As a result of the heat, gas, and/or vapor in the area 710, the end sheet 110 and the first interior sheet 140 or the last interior sheet 150 will not be completely brazed in the area 710 in the resulting assembly 100. An end sheet 110 may include slots 320 and holes 310 that vent heat, gas, and vapor as well as slots 320 that channel heat, gas, and vapor to one or more areas 710 of the interior surface 115.

Figure 8:
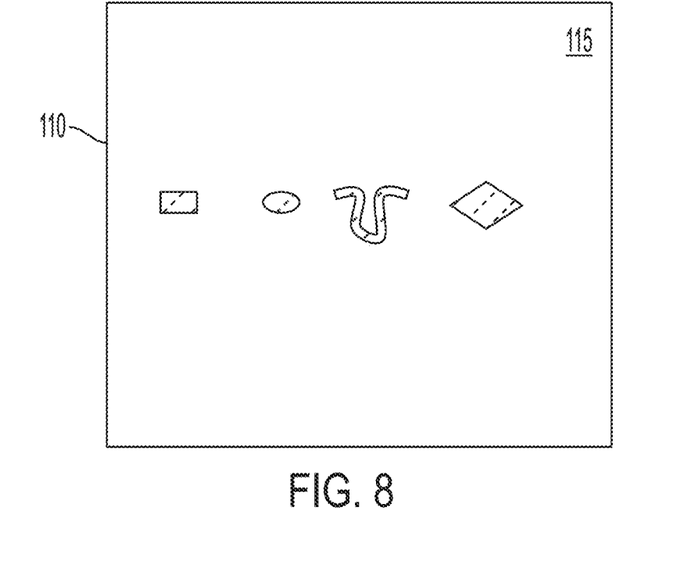
FIG. 8 shows an exemplary end sheet of an assembly that facilitates control of assembly fabrication via brazing based on holes according to one or more embodiments.

FIG. 8 shows an exemplary end sheet 110 of an assembly 100 that facilitates control of assembly fabrication via brazing according to one or more embodiments. The interior surface 115 of the end sheet 110 is visible in the view of FIG. 8. The venting features 300 included on the interior surface 115 are holes 310. The exemplary holes 310 shown in FIG. 8 illustrate that the holes 310 may be of different shapes and sizes and may, as shown in FIG. 8, be a mix of different types of holes 310. The holes 310 may have geometric shapes (e.g., rectangle, oval, diamond) or irregular shapes. As with the slots 320, the locations and characteristics of the holes 310 may be selected based on an analysis of the brazing process for the specific dimensions and materials of the end sheets 110 and first interior sheet 140 or last interior sheet 150 involved.

Figure 9:
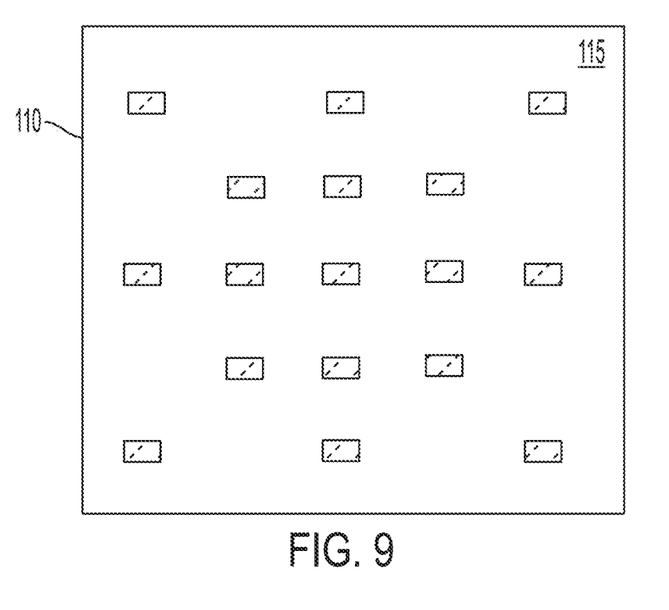
FIG. 9 shows an exemplary end sheet of an assembly that facilitates control of assembly fabrication via brazing based on an exemplary pattern of holes according to one or more embodiments.

FIG. 9 shows an exemplary end sheet 110 of an assembly 100 that facilitates control of assembly fabrication via brazing according to one or more embodiments. The interior surface 115 of the end sheet 110 is visible in the view of FIG. 9. The venting features 300 included on the interior surface 115 are holes 310 arranged in a pattern with a concentration of the holes 310 in the center of the interior surface 115 where heat, gas, and vapor may be concentrated during the brazing process. This exemplary pattern does not limit the patterns, sizes, and shapes of holes 310 that may be used. As previously noted, slots 320 may be used in conjunction with the holes 310, as well.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system to control fabrication of an assembly, the system comprising:
   a first end sheet having an interior surface and an exterior surface, opposite the interior surface, wherein the exterior surface of the first end sheet is an exterior of the assembly;
   two or more interior sheets, the two or more interior sheets including a first interior sheet at one end of a stack of the two or more interior sheets and including a last interior sheet at an opposite end of the stack of the two or more interior sheets, the first interior sheet being adjacent to the interior surface of the first end sheet;
   a second end sheet having an interior surface and an exterior surface, opposite the interior surface, wherein the exterior surface of the second end sheet is also an exterior of the assembly,
   the last interior sheet of the two or more interior sheets is adjacent to the interior surface of the last end sheet, and
   the interior surface of the first end sheet or the interior surface of the second end sheet includes one or more venting features, the one or more venting features including slots configured to channel heat, gas, or vapor during a brazing process to braze the first end sheet, the two or more interior sheets, and the second end sheet into the assembly, wherein the slots are formed in a pattern, wherein the pattern includes concentric circles with diagonal slots that cross at a center of the concentric circles and extend to the edges of the interior surface of the first end sheet or the second end sheet.

2. The system according to claim 1, wherein slots channel the heat, the gas, or the vapor from a central portion of the interior surface to edges of the interior surface of the first end sheet or the second end sheet.

3. The system according to claim 1, wherein both the interior surface of the first end sheet and the interior surface of the second end sheet include the one or more venting features.

\* \* \* \* \*